United States Patent
Chang et al.

(10) Patent No.: US 8,811,750 B2
(45) Date of Patent: Aug. 19, 2014

(54) APPARATUS AND METHOD FOR EXTRACTING EDGE IN IMAGE

(75) Inventors: Ji Ho Chang, Gyeonggi-do (KR); Dae Hwan Hwang, Daejeon (KR); Jae Il Cho, Daejeon (KR); Dong Il Han, Seoul (KR); Jong Ho Choi, Seoul (KR)

(73) Assignees: Electronics and Telecommunications Research Institute, Daejeon (KR); Sejong University Industry Academy Cooperation Foundation, Seoul (KR)

( * ) Notice: Subject to any disclaimer, the term of this patent is extended or adjusted under 35 U.S.C. 154(b) by 163 days.

(21) Appl. No.: 13/614,652

(22) Filed: Sep. 13, 2012

(65) Prior Publication Data

US 2013/0163869 A1 Jun. 27, 2013

(30) Foreign Application Priority Data

Dec. 21, 2011 (KR) .................. 10-2011-0139621

(51) Int. Cl.
*G06K 9/48* (2006.01)

(52) U.S. Cl.
USPC ............................................ 382/199; 382/172

(58) Field of Classification Search
USPC .................... 382/168, 172, 199, 260, 275
See application file for complete search history.

(56) References Cited

U.S. PATENT DOCUMENTS

| | | | |
|---|---|---|---|
| 2004/0109595 A1* | 6/2004 | Luo et al. ...................... | 382/132 |
| 2006/0008147 A1* | 1/2006 | Jung et al. .................... | 382/176 |
| 2009/0226033 A1* | 9/2009 | Sefcik .......................... | 382/103 |
| 2011/0081087 A1 | 4/2011 | Moore | |

* cited by examiner

*Primary Examiner* — Phuoc Tran
(74) *Attorney, Agent, or Firm* — Rabin & Berdo, P.C.

(57) ABSTRACT

Disclosed are an apparatus and a method for extracting an edge to be used for extracting a feature point of an object in an image. The present invention proposes an image edge extracting apparatus and method that remove noise in an input image, calculate a gradient of an image in a noise-removed image, measure magnitude of the gradient, extract an edge having a maximum thickness value, and then calculate a threshold using a ratio of the extracted edge, and detect a final edge robust against noise based on the threshold.

19 Claims, 22 Drawing Sheets

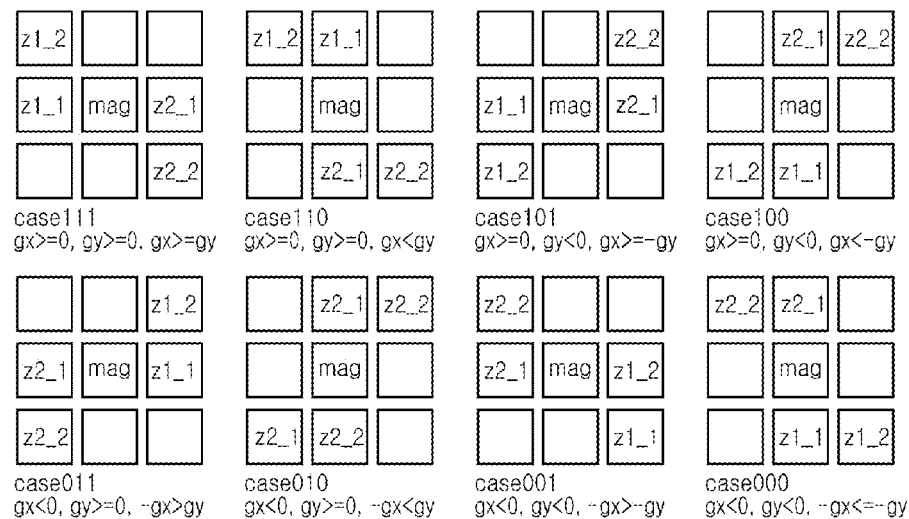

APPARATUS AND METHOD FOR EXTRACTING EDGE IN IMAGE

CROSS-REFERENCE TO RELATED APPLICATIONS

This application claims priority to and the benefit of Korean Patent Application No. 10-2011-0139621 filed in the Korean Intellectual Property Office on Dec. 21, 2011, the entire contents of which are incorporated herein by reference.

TECHNICAL FIELD

The present invention relates to an apparatus and a method for extracting an edge in an image, and more particularly, to an apparatus and method for extracting an edge to be used for extracting a feature point of an object.

BACKGROUND ART

Currently, development of a pattern recognition technology and a neural network technology using a unique feature point of an object has been actively conducted. Representatively, an automated or artificial intelligent technology may be used as an example. Such artificial intelligent technology has been widely used as a character recognition technology of automatically reading a printed or handwritten text, a parking and driving system technology of enabling a vehicle to be automatically parked or driven by recognizing a lane, a tracking system technology of detecting and then tracking a predetermined object, and the like.

Currently, together with growth of a market associated with digital devices, smart phones, and the like, the artificial intelligent technology has been further variously developed. When applying a character recognition and object recognition technology in the above environment, an added value of a product may be improved and sales may increase.

So far, a pattern recognition algorithm such as character recognition and object recognition and lane recognition has been developed in a form of algorithm that generally operates in a PC-based environment. When directly applying the above technology to an embedded system, real-time recognition processing may be impossible or detection information may have a low reliability due to relatively insufficient resource and performance.

In the related art, an object feature point extraction algorithm including pattern recognition may degrade feature point extraction performance based on quantized noise of a camera. To solve the above issue, an additional processing process is required. Therefore, an increase in a calculation amount and apparatus complexity makes it difficult to install the object feature point extraction algorithm in hardware that is not based on a PC.

In hardware configuration, the object feature point extraction algorithm uses many resources and thus, may be difficult to be commercialized. Even though the object feature point extraction algorithm is commercialized, an increase in a processing time according to an increase in a calculation amount may make real-time processing difficult. Accordingly, there is a need for development of a real-time processing engine that is robust against noise and thus, shows highly reliable object feature point extraction performance and may be directly configured in hardware at a high processing rate, instead of a simple feature point extraction algorithm.

SUMMARY OF THE INVENTION

The present invention has been made in an effort to provide an image edge extracting apparatus and method that remove noise in an input image, calculate a gradient of an image in a noise-removed image, measure magnitude of the gradient, extract an edge having a maximum thickness value, and then calculate a threshold using a ratio of the extracted edge, and detect a final edge robust against noise based on the threshold.

An exemplary embodiment of the present invention provides an apparatus for quickly detecting an edge using an image processing scheme, the apparatus including: a noise removal block to remove image noise by dividing, into a plurality of regions, an image that is input in real time; a gradient operation processing block to calculate a gradient of the image using the noise-removed image; a gradient magnitude calculator to calculate magnitude of the gradient using the gradient-calculated image; a maximum edge detection block to detect only a necessary edge using the gradient-magnitude calculated image; a threshold calculation processing block to calculate a high threshold and a low threshold using an input threshold ratio; and a history edge detection block to generate a final edge image using an input maximum edge image and a threshold.

The noise removal block may include: an image storing and dividing unit to store the input image in an internal memory and then divide the stored input image into a plurality of regions; a range weight LUT unit to generate a range weight using the divided input image; and a noise removal calculator to remove the image noise for each region with respect to the divided input image and the range weight.

The gradient operation processing block may include: an image storing and dividing unit to store the input image in an internal memory and then divide the stored input image into four regions of up, down, left, and right; and a gradient calculator to calculate a gradient of each of X and Y axes of an image using the divided input image.

The gradient magnitude calculator may generate an image of which magnitude value of gradient is calculated using the input image of which gradient value is calculated.

The maximum edge detection block may include: an image storing and dividing unit to store the input image in an internal memory and then divide the stored input image into a plurality of regions; and a maximum edge calculator to remove an overlapping edge using the divided input image.

The threshold calculation processing block may include: an image distribution analyzer to analyze an image using the input maximum edge image and to generate a histogram; an image distribution memory to store the generated histogram; and a threshold calculator to generate a high threshold and a low threshold using the input threshold ratio an address value of the analyzed histogram.

The history edge detection block may include: an input image memory unit to alternately call the stored input image at intervals of a single frame after storing the image in an internal memory; an input verification memory unit to verify a primary search path in the image; an edge detection processing unit to detect and process a robust edge and a weak-but-necessary edge using a high threshold and a low threshold in the image; a neighbor pixel generator to detect the neighboring weak-but-necessary edge after detecting the robust edge; a stack memory unit to perform edge detection processing within the image using a last-in first-out (LIFO) scheme; and an output image memory unit to output, to a display, an edge detection result in the image.

Another exemplary embodiment of the present invention provides a method of quickly detecting an edge using an image processing scheme, the method including: a noise removing operation of removing image noise by dividing, into a plurality of regions, an image that is input in real time; a gradient operation processing operation of calculating a gradient of the image using the noise-removed image; a gradient magnitude calculating operation of calculating magnitude of the gradient using the gradient-calculated image; a maximum edge detecting operation of detecting only a necessary edge using the gradient-magnitude calculated image; a threshold calculation processing operation of calculating a high threshold and a low threshold using an input threshold ratio; and a history edge detecting operation of generating a final edge image using an input maximum edge image and a threshold.

The noise removing operation may include: an image storing and dividing operation of storing the input image in an internal memory and then dividing the stored input image into a plurality of regions; a range weight LUT operation of generating a range weight using the divided input image; and a noise removal calculating operation of removing the image noise for each region with respect to the divided input image and the range weight.

The gradient operation processing operation may include: an image storing and dividing operation of storing the input image in an internal memory and then dividing the stored input image into four regions of up, down, left, and right; and a gradient calculating operation of calculating a gradient of each of X and Y axes of an image using the divided input image.

The gradient magnitude calculating operation may generate an image of which magnitude value of gradient is calculated using the input image of which gradient value is calculated.

The maximum edge detecting operation may include: an image storing and dividing operation of storing the input image in an internal memory and then dividing the stored input image into a plurality of regions; and a maximum edge calculating operation of removing an overlapping edge using the divided input image.

The threshold calculation processing operation may include: an image distribution analyzing operation of analyzing an image using the input maximum edge image and generating a histogram; an image distribution memory operation of storing the generated histogram; and a threshold calculating operation of generating a high threshold and a low threshold using the input threshold ratio an address value of the analyzed histogram.

The history edge detecting operation may include: an input image memory operation of alternately calling the stored input image at intervals of a single frame after storing the image in an internal memory; an input verification memory operation of verifying a primary search path in the image; an edge detecting and processing operation detecting and processing a robust edge and a weak-but-necessary edge using a high threshold and a low threshold in the image; a neighbor pixel generating operation of detecting the neighboring weak-but-necessary edge after detecting the robust edge; a stack memory operation of performing edge detection processing within the image using a last-in first-out (LIFO) scheme; and an output image memory operation of outputting, to a display, an edge detection result in the image.

According to exemplary embodiments of the present invention, there is proposed a high-speed object feature point extraction method that may extract a highly reliable feature point of an object in a quantized noise image and a complex image occurring while receiving an image from a camera and may also perform real-time processing by applying an image signal processing and computer vision scheme.

Currently, various types of object feature point extraction methods have been proposed, but the object feature point extraction methods are proposed in an algorithm form and thus, are difficult to be directly embodied as a hardware structure in an embedded environment. Extraction of a highly reliable feature point of an object in a noise and complex image may not act robust against external constraint elements. Therefore, there are still many difficulties in commercializing the object feature point extraction method.

For example, quantized0 noise that occurs during an input process due to unstable camera balance is unnecessary feature point information, but is extracted and thereby degrades reliability. However, an object feature point extraction method robust against a noise and complex image that is applied with image signal processing and computer vision scheme according to the present invention may act robust external constraint elements such as quantized noise of a camera, a complex image, and the like, in addition to characteristics regardless of an environmental change and a change in magnitude. Through this, compared to existing methods, it is possible to extract a further reliable feature point of an object and to perform real-time processing at a high rate.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 15 is a diagram to describe conditions according to eight directions and positions of pixels according thereto in the maximum edge detector.

FIG. 16 is a diagram to describe conditions according to eight directions and corresponding equations in the maximum edge detector.

Figure 1:
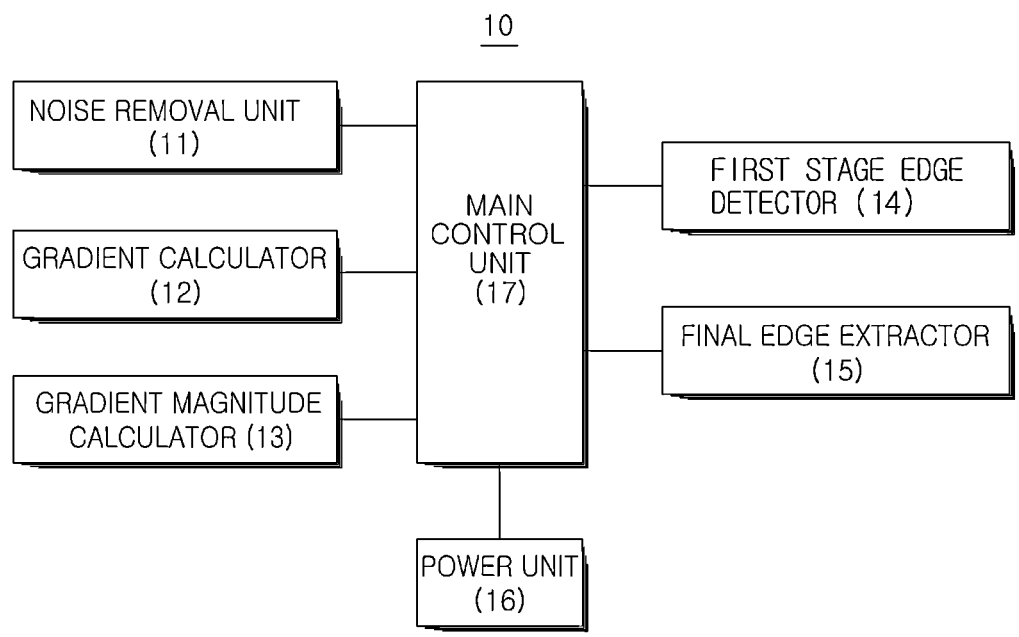
FIG. 1 is a block diagram schematically illustrating an image edge extraction apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

FIG. 1 is a block diagram schematically illustrating an image edge extraction apparatus 10 according to an exemplary embodiment of the present invention. FIGS. 2A and 2B, and FIGS. 3A and 3B are block diagrams illustrating an internal configuration of the image edge extraction apparatus 10 of FIG. 1 in detail. FIG. 4 is a block diagram illustrating a configuration added to the image edge extraction apparatus 10 of FIG. 1 in detail. Hereinafter, a description will be made with reference to FIGS. 1 through 4.

Referring to FIG. 1, the image edge extraction apparatus 10 includes a noise removal unit 11, a gradient calculator 12, a gradient magnitude calculator 13, an first stage edge detector 14, a final edge extractor 15, a power unit 16, and a main control unit 17.

The image edge extraction apparatus 10 removes noise in an input image, calculates a gradient of an image in a noise-removed image, measures magnitude of the gradient, extracts an edge having a maximum thickness value, and then calculates a threshold using a ratio of the extracted edge and detects a final edge robust against noise based on the threshold. The image edge extraction apparatus 10 may use the final edge as a feature point of an object. When using the image edge extraction apparatus 10, it is possible to embody an object feature point extraction apparatus suitable for detecting edge information within an input image using a camera device.

The noise removal unit 11 functions to remove noise in an input image. The noise removal unit 11 may remove the noise in the input image using a bilateral filter.

Figure 2A:
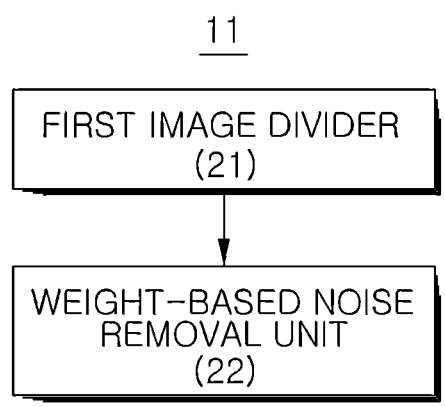
FIGS. 2A and 2B, and FIGS. 3A and 3B are block diagrams illustrating an internal configuration of the image edge extraction apparatus of FIG. 1 in detail.

As shown in FIG. 2A, the noise removal unit 11 may include a first image divider 21 and a weight-based noise removal unit 22. The first image divider 21 functions to divide the input image into regional images. The weight-based noise removal unit 22 functions to remove noise in each regional image using a first weight according to a distance difference between the regional images or a second weight according to a brightness difference between the regional images.

The gradient calculator 12 functions to calculate a gradient of a noise-removed image.

Figure 2B:
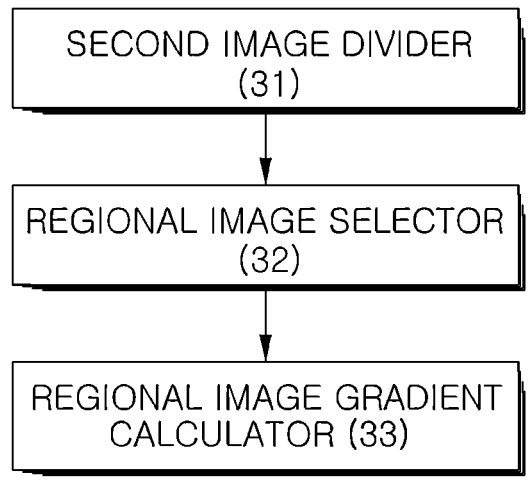

As shown in FIG. 2B, the gradient calculator 12 may include a second image divider 31, a regional image selector 32, and a regional image gradient calculator 33. The second image divider 31 functions to divide the noise-removed image into regional images. The regional image selector 32 functions to select, from among the regional images, a regional image of which the gradient is to be calculated. The regional image gradient calculator 33 functions to calculate a gradient of the selected regional image for each axis by differentiating the selected regional image with respect to each axial direction using neighbor regional images that are adjacent to the selected regional image. The gradient calculator 12 may calculate a gradient with respect to a regional image divided by the noise removal unit 11. In this case, the gradient calculator 12 may not include the second image divider 31.

The gradient magnitude calculator 13 functions to calculate magnitude of the gradient.

The first stage edge detector 14 functions to detect, as first stage edges, edges that satisfy a first condition in the noise-removed image using the gradient and the magnitude.

Figure 3A:
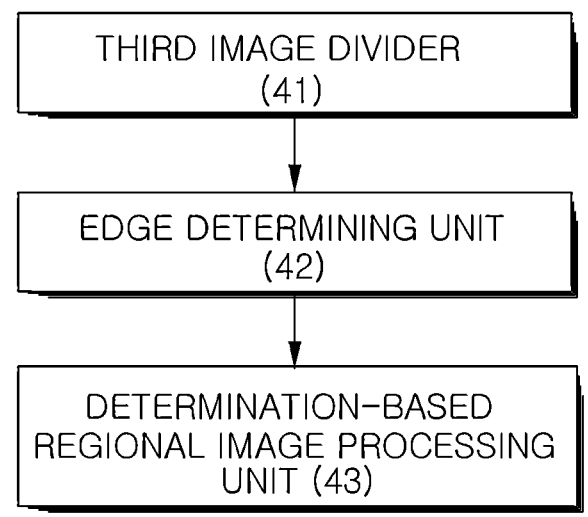
Figure 4:
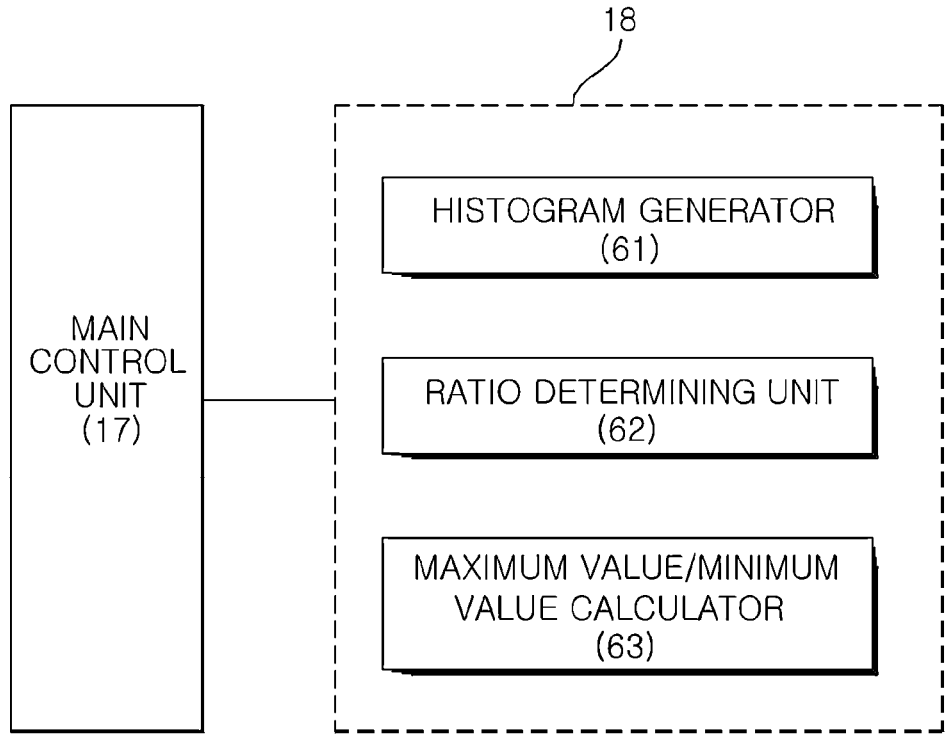
FIG. 4 is a block diagram illustrating a configuration added to the image edge extraction apparatus of FIG. 1 in detail.

As shown in FIG. 3A, the first stage edge detector 14 may include a third image divider 41, an edge determining unit 42, and a determination-based regional image processing unit 43. The third image divider 41 functions to divide, into regional images, an image of which magnitude of the gradient is calculated. The edge determining unit 42 functions to determine whether each regional image corresponds to an edge, based on a relationship between each regional image and neighbor regional images that are adjacent to the each regional image. The determination-based regional image processing unit 43 functions to detect a regional image corresponding to an edge as an edge that satisfies the first condition based on the determination, and to remove a regional image not corresponding to the edge based on the determination. The edge determining unit 42 may perform determination with respect to a regional image divided by the noise removal unit 11 or a regional image divided by the gradient calculator 12. In this case, the first stage edge detector 14 may not include the third image divider 41.

The final edge extractor 15 functions to extract, as final edges, edges that satisfy a second condition among the first stage edges based on an edge related threshold. The final edge extractor 15 may use a maximum threshold and a minimum threshold as thresholds.

Figure 3B:
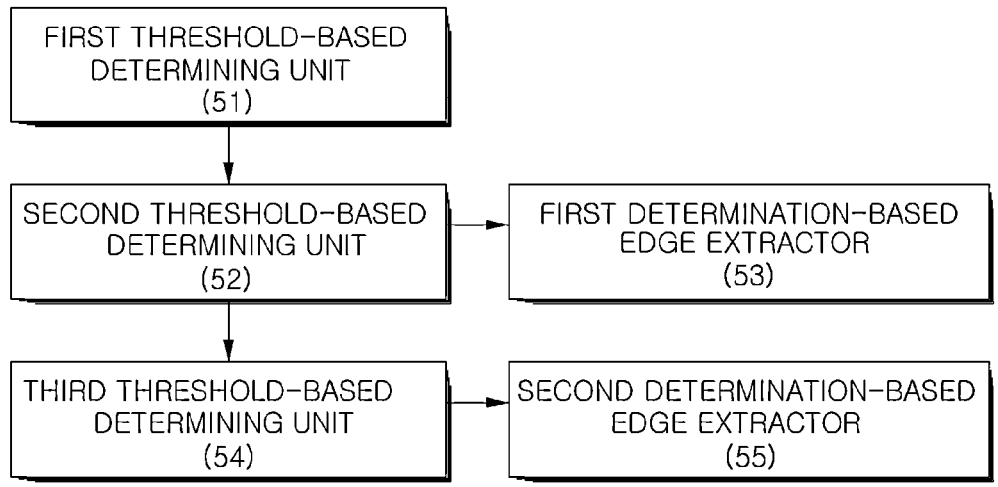

As shown in FIG. 3B, the final edge extractor 15 may include a first threshold-based determining unit 51, a second threshold-based determining unit 52, and a first determination-based edge extractor 53. The first threshold-based determining unit 51 functions to determine whether there is a first edge having a value greater than the maximum threshold among the first stage edges. The second threshold-based determining unit 52 functions to determine whether there is a second edge having a value greater than the minimum threshold and less than the maximum threshold among first neighbor edges that are adjacent to the first stage edge. The first determination-based edge extractor 53 functions to extract the first edge and the second edge as the final edges.

The final edge extractor 15 may further include a third threshold-based determining unit 54 and a second determination-based edge extractor 55. The third threshold-based determining unit 54 functions to determine whether there is a third edge having a value greater than the minimum threshold and less than the maximum threshold among second neighbor edges that are adjacent to the edge. The second determination-based edge extractor 55 functions to extract the third edge as the final edge. The third threshold-based determining unit 54 may repeatedly performs the determination until there is no neighbor edge that is adjacent to the edge.

The power unit 16 functions to supply power to each of the constituent elements that constitute the image edge extraction apparatus 10.

The main control unit 17 functions to control the overall operation of each of the constituent elements that constitute the image edge extraction apparatus 10.

As shown in FIG. 4, the image edge extraction apparatus 10 may further include a threshold calculator 18. The threshold calculator 18 functions to calculate the threshold based on a ratio of the first stage edges that are distributed in the input image.

The threshold calculator 18 may include a histogram generator 61, a ratio determining unit 62, and a maximum value/minimum value calculator 63. The histogram generator 61 functions to generate a relationship between the input image and the first stage edges as a histogram. The ratio determining unit 62 functions to determine the ratio as the number of first stage edges to be arranged in the input image using the histogram. The maximum value/minimum value calculator 63 functions to calculate the maximum number of first stage edges or the minimum number of first stage edges as the threshold based on the determined ratio.

Next, an edge detection apparatus will be described using an embodiment of the image edge extraction apparatus 10.

To obtain a property robust against quantized noise and the like occurring while receiving an image from a camera, the edge detection apparatus effectively removes noise using a bilateral filtering scheme and at the same time, clearly emphasizes a boundary line. The edge detection apparatus may use an automatic threshold generator and, compared to a previous structure, may further improve object feature point extraction performance using a non-maximum suppression analysis scheme, a hysteresis analysis scheme, and the like.

By applying an image processing and computer vision scheme, the edge detection apparatus may be configured as a real-time processing hardware Internet protocol (IP) development apparatus of an algorithm that effectively detects a necessary edge robust against noise. The edge detection apparatus includes a noise removal unit to remove quantized noise occurring while receiving an image from a camera for optimization of an operation process, a gradient operation processing unit to calculate a gradient of the image by calculating a primary differential value of the image, a gradient magnitude calculator to measure magnitude of the calculated gradient, a maximum edge detector to extract only an edge having a maximum value among overlapping thick edges, a threshold calculation processing unit to analyze the image and to calculate a threshold of the edge using a ratio of the input edge, a history edge detector to extract an edge over the threshold and a weak edge neighboring thereto, and the like. Consequently, the edge detection apparatus may effectively extract a necessary edge robust against noise. Hereinafter, the edge detection apparatus will be further described with reference to the accompanying drawings.

Figure 5:
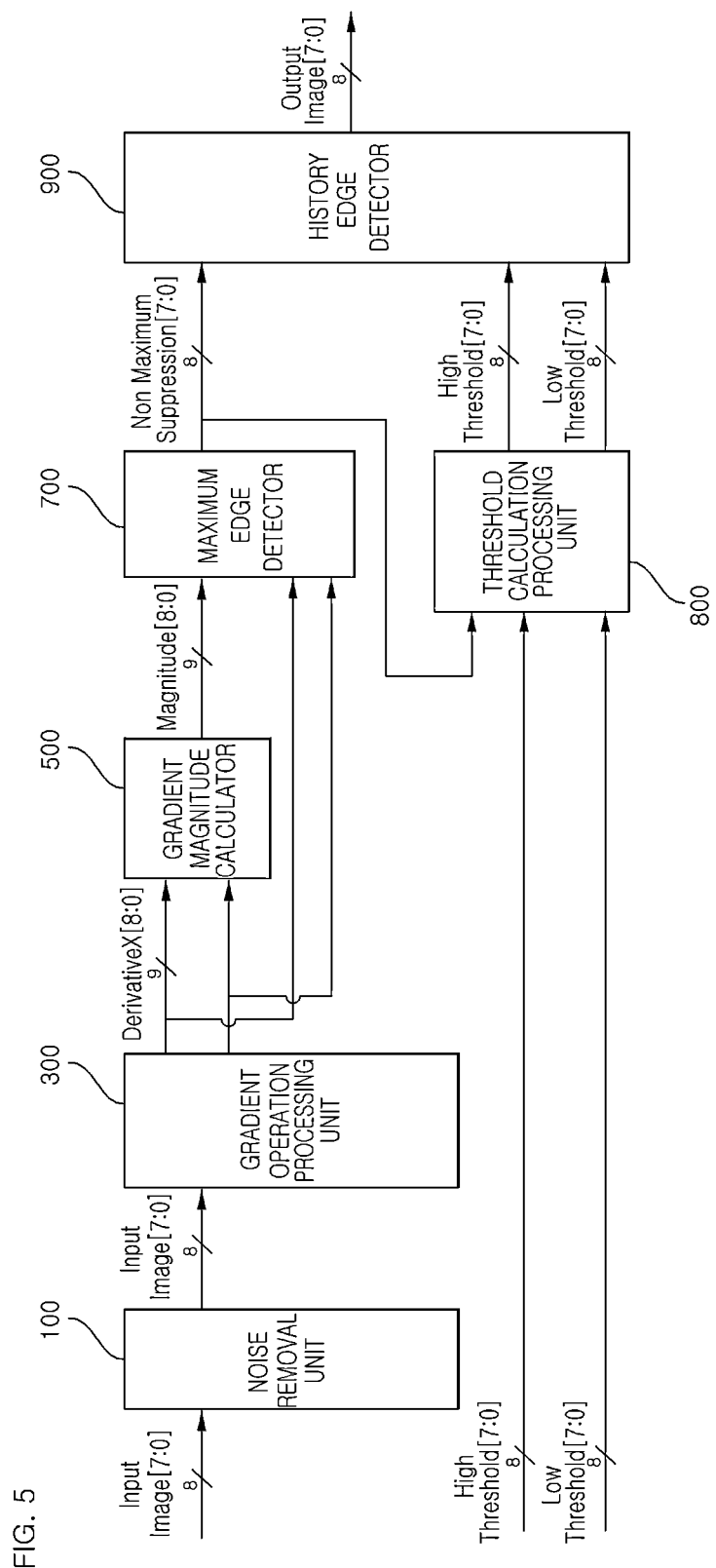
FIG. 5 is a block diagram illustrating a high-speed edge detection apparatus using an image processing scheme according to an exemplary embodiment of the present invention.
Figure 6A:
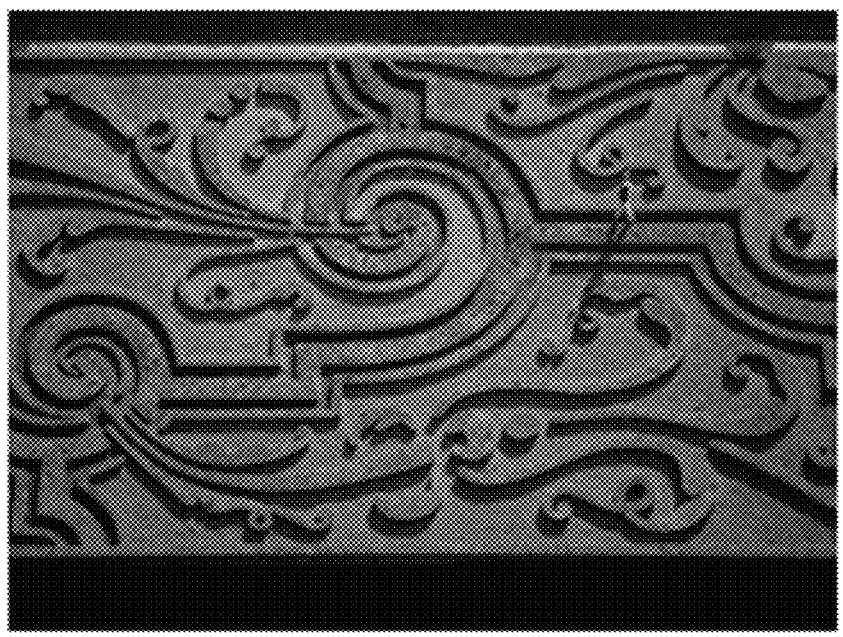
FIGS. 6A through 6G illustrate result images by the edge detection apparatus of FIG. 5.
Figure 6B:
Figure 6C:
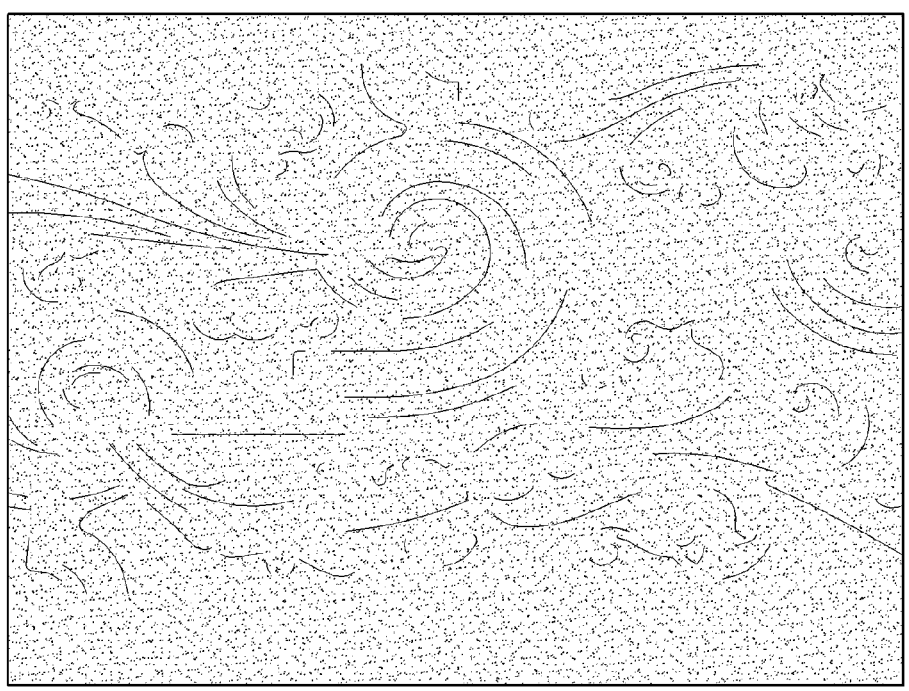
Figure 6D:
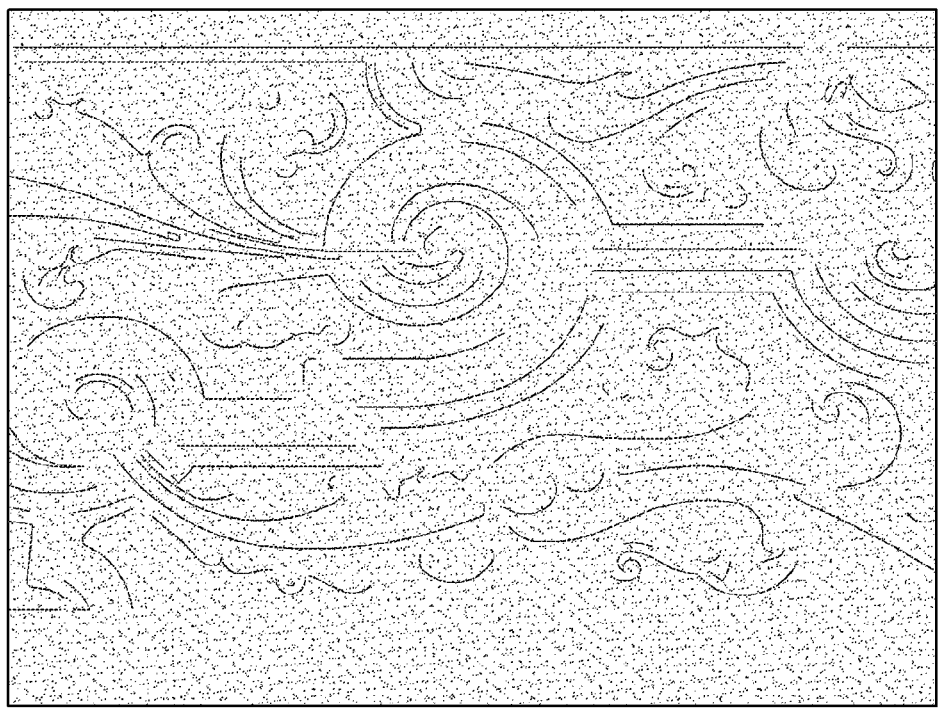
Figure 6E:
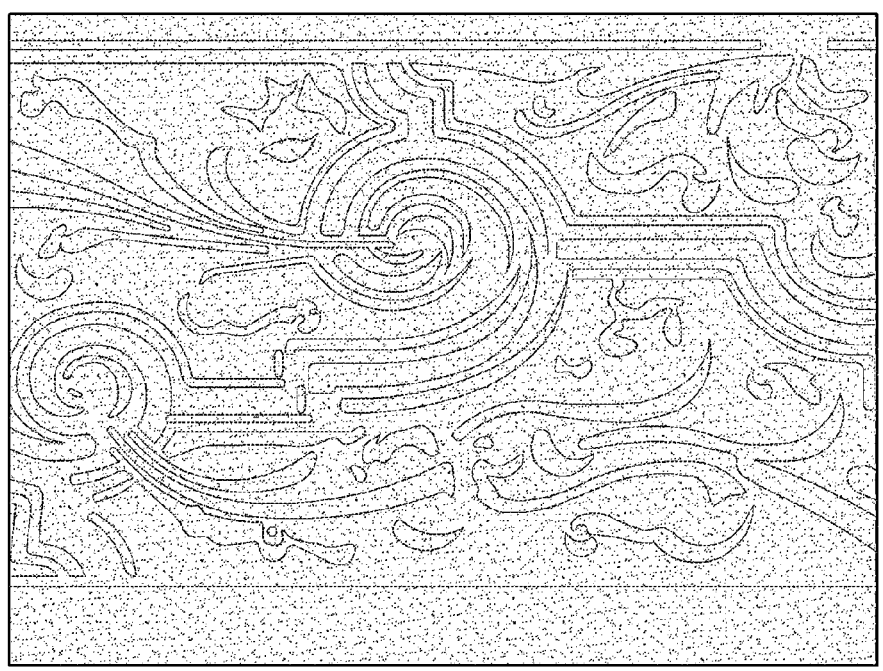
Figure 6F:
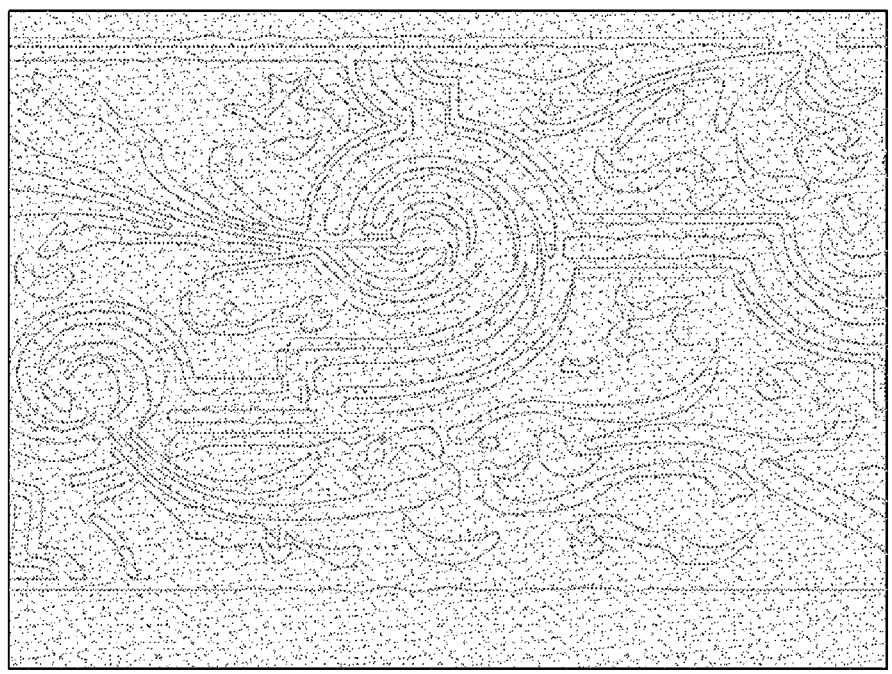
Figure 6G:
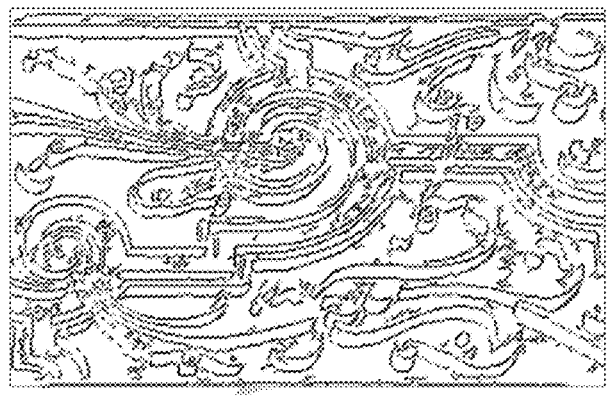
Figure 7:
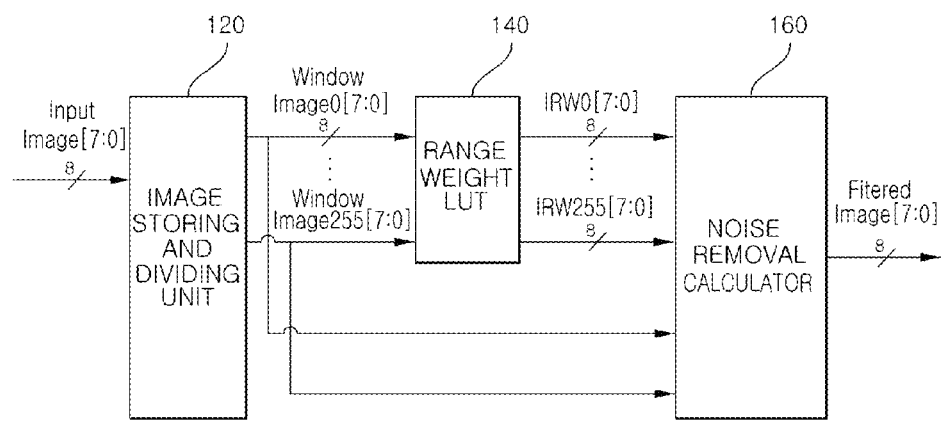
FIG. 7 is a diagram to describe a noise removal unit.
Figure 8A:
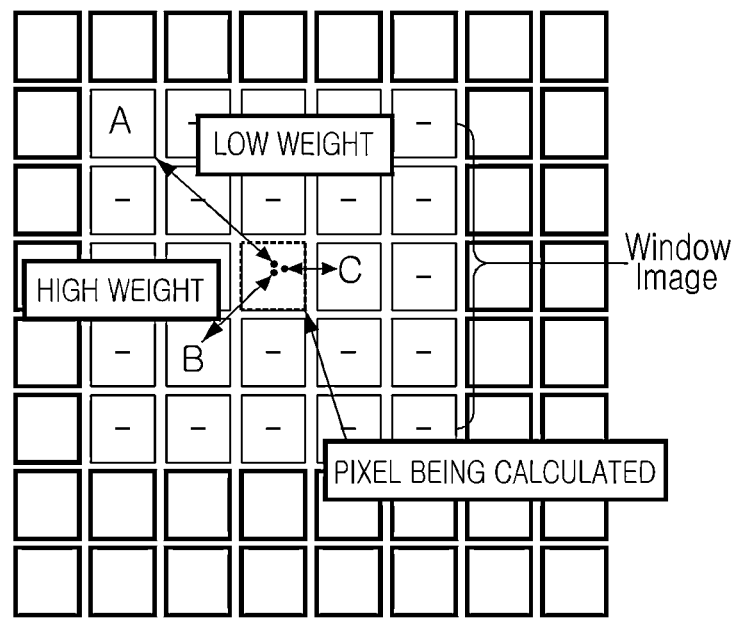
FIGS. 8A and 8B are diagrams to describe a method of calculating a weight in the noise removal unit.
Figure 8B:
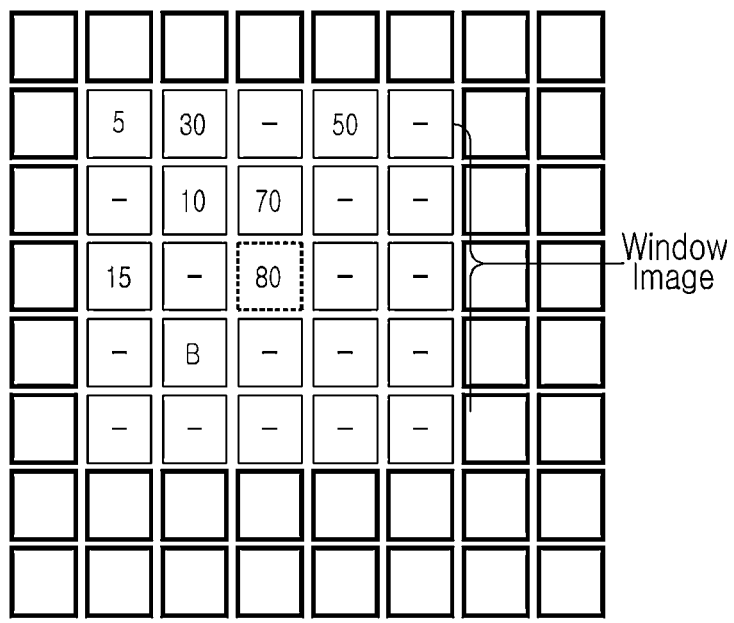
Figure 9:
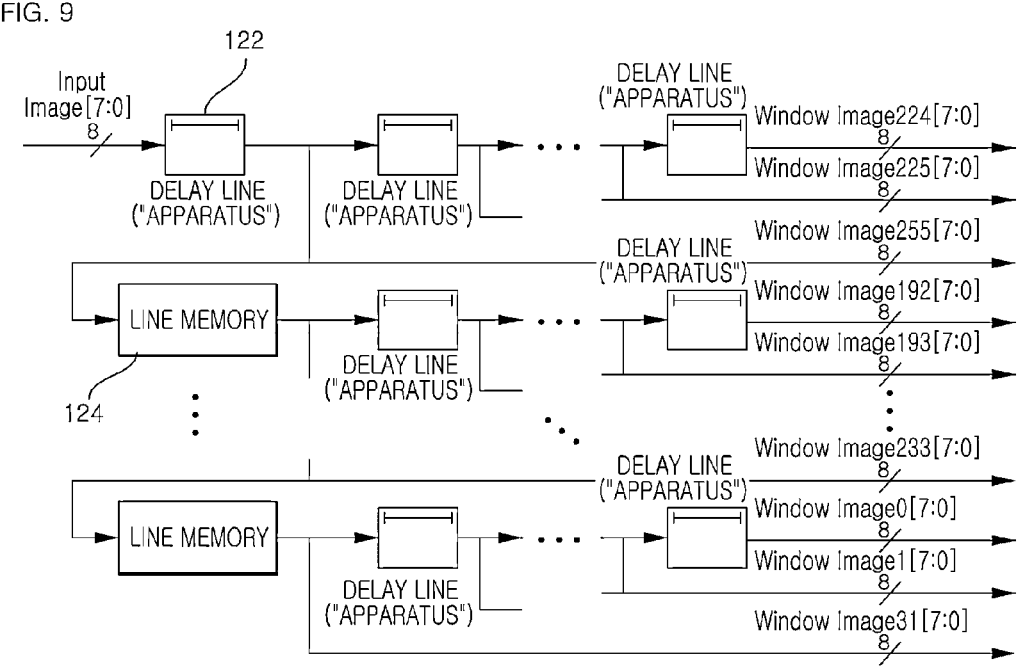
FIG. 9 is a diagram to describe an image storing and dividing unit of the noise removal unit in detail.
Figure 10:
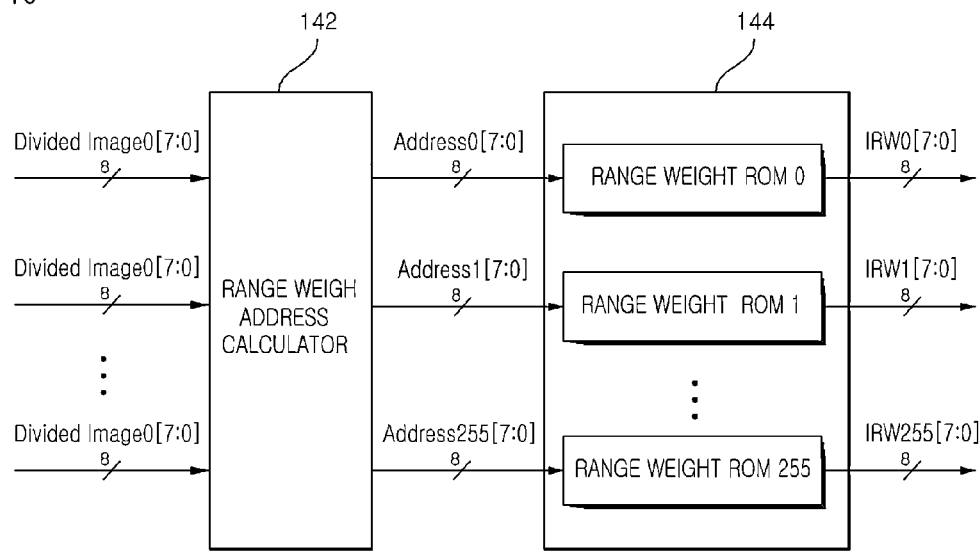
FIG. 10 is a diagram to describe a range weight LUT of the noise removal unit in detail.
Figure 11A:
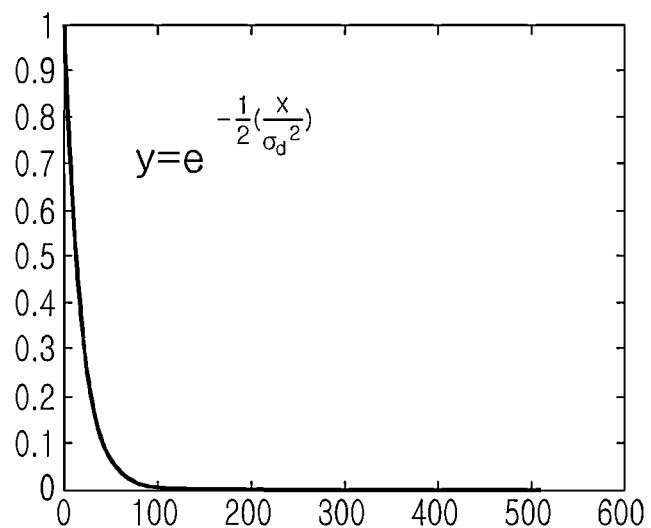
FIGS. 11A and 11B are graphs showing an example of distribution of weights in the noise removal unit.
Figure 11B:
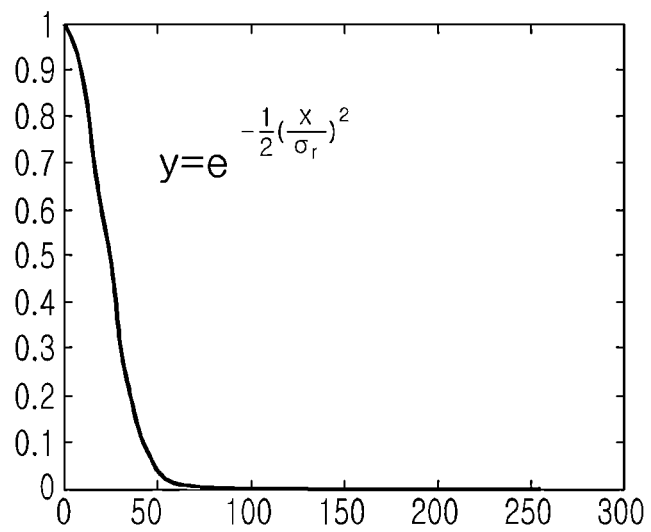
Figure 12:
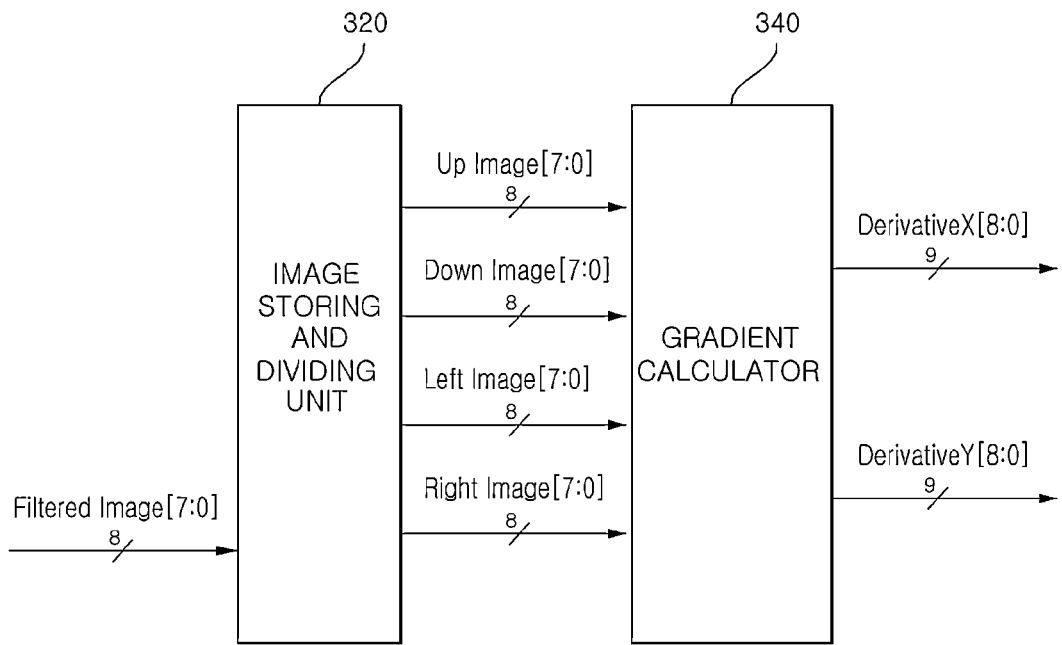
FIG. 12 is a diagram to describe a gradient operation processing unit.
Figure 13:
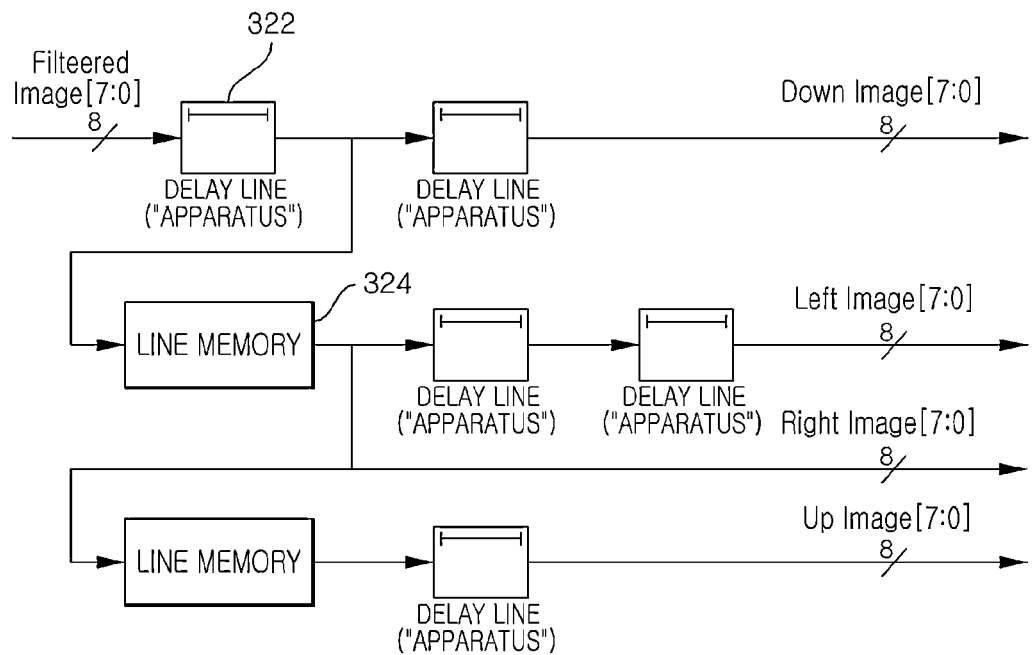
FIG. 13 is a diagram to describe an image storing and dividing unit in the gradient operation processing unit in detail.
Figure 14:
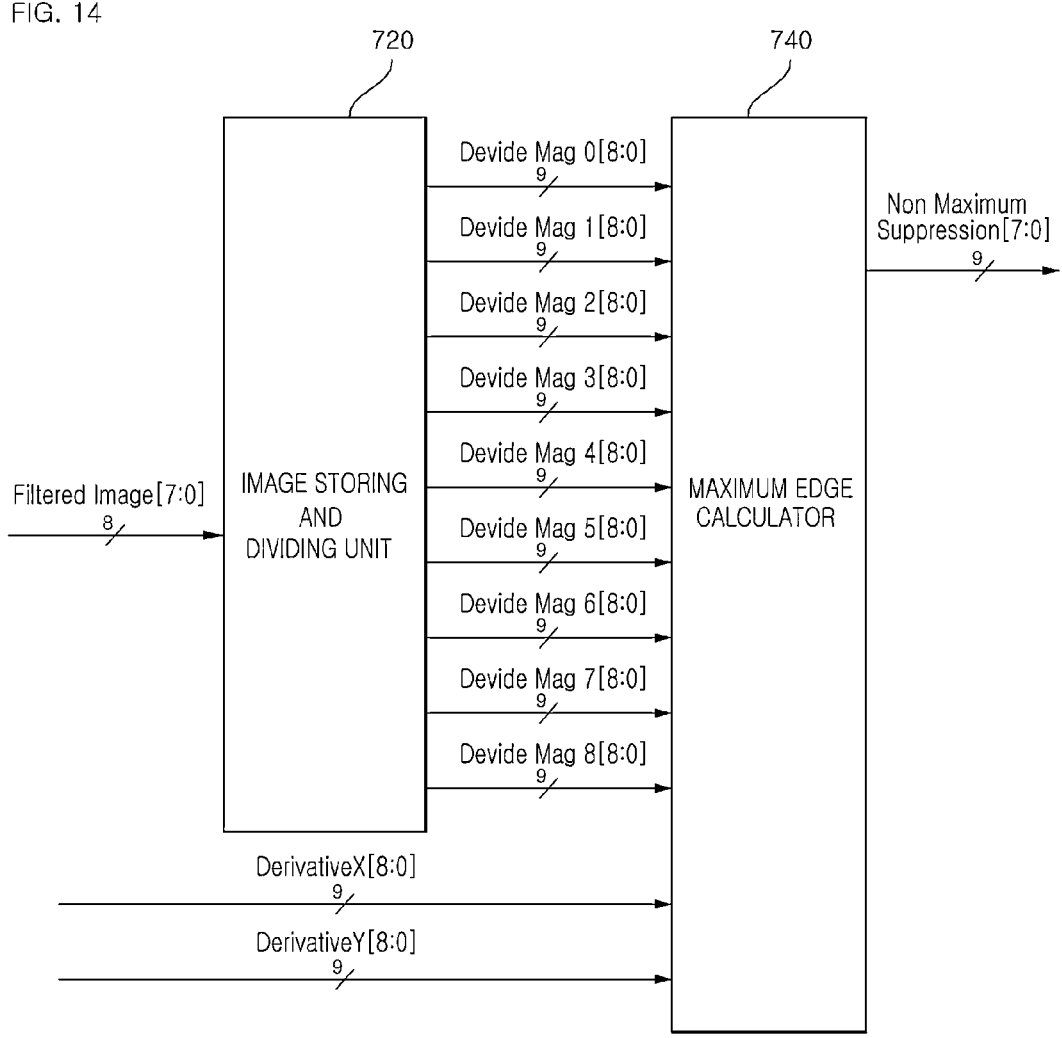
FIG. 14 is a diagram to describe a maximum edge detector.
Figure 17:
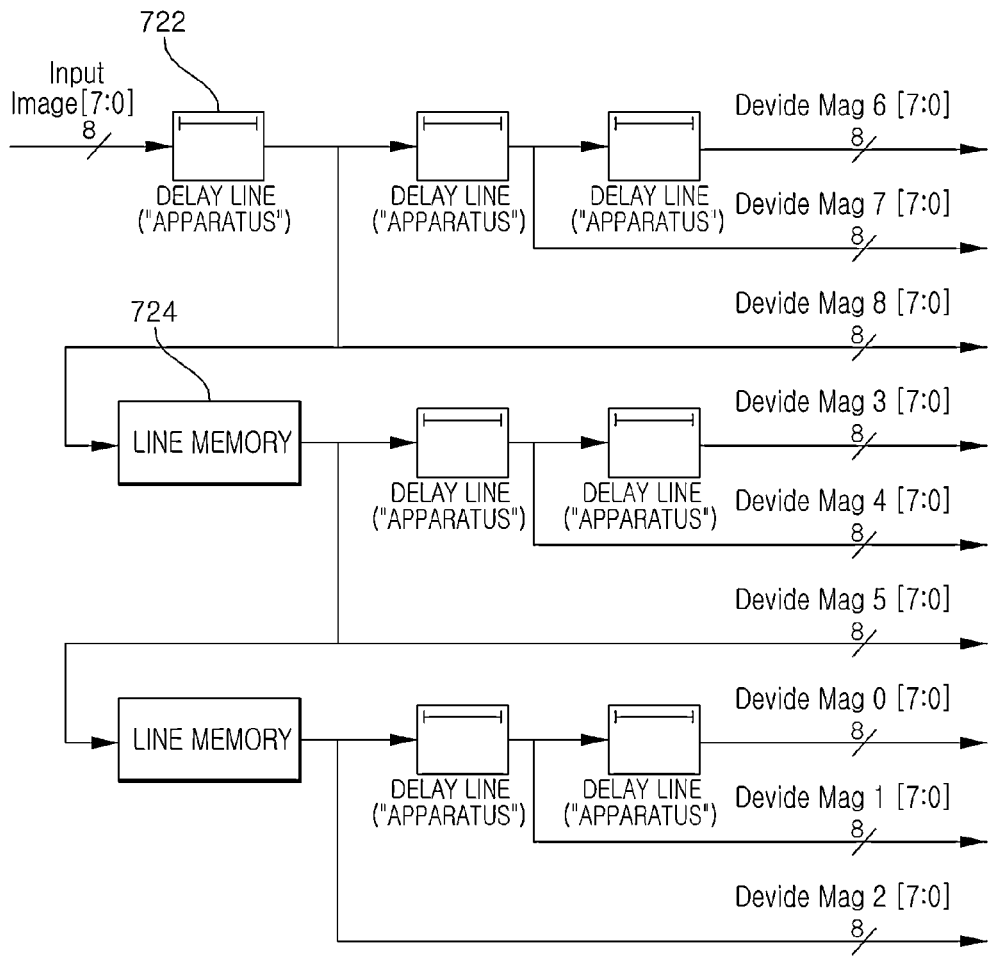
FIG. 17 is a diagram to describe an image storing and dividing unit in the maximum edge detector in detail.
Figure 18:
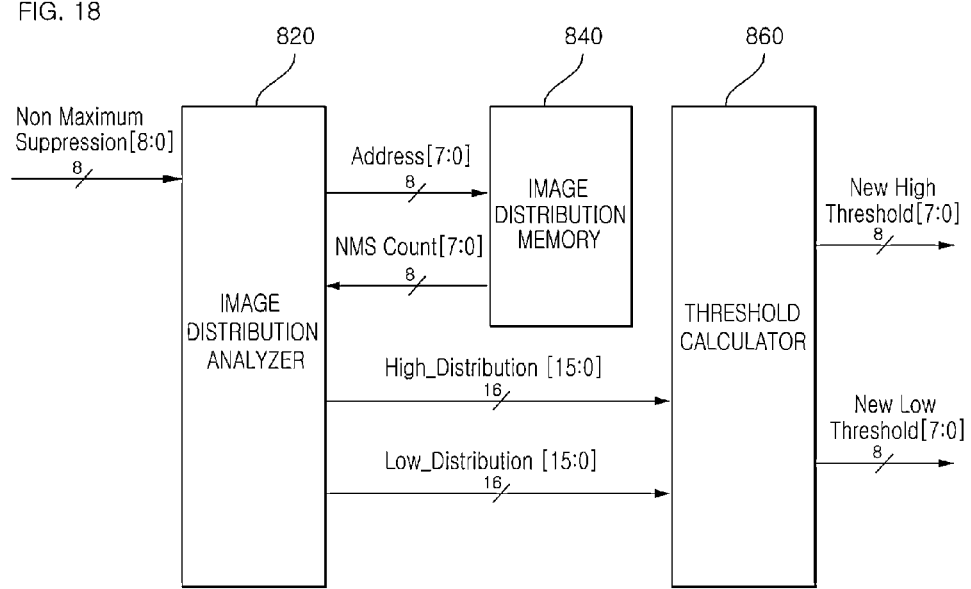
FIG. 18 is a diagram to describe a threshold calculation processing unit.
Figure 19:
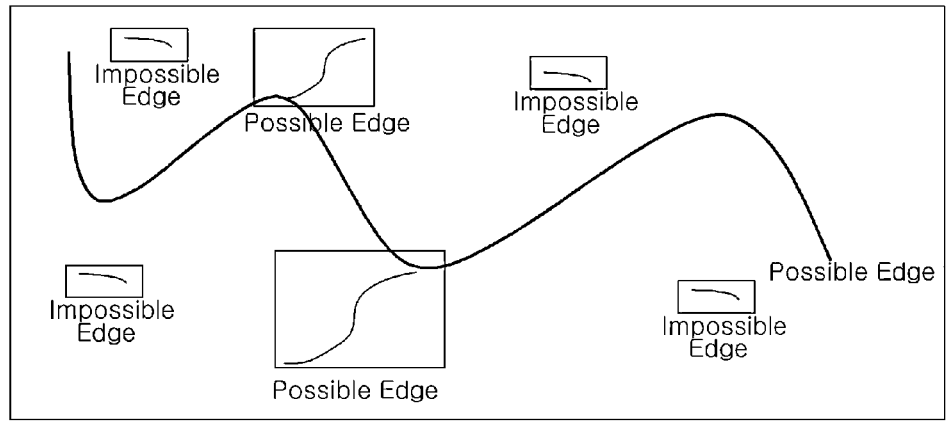
FIG. 19 is a diagram to describe an example of distribution of an image and a threshold calculation process in the threshold calculation processing unit.
Figure 20:
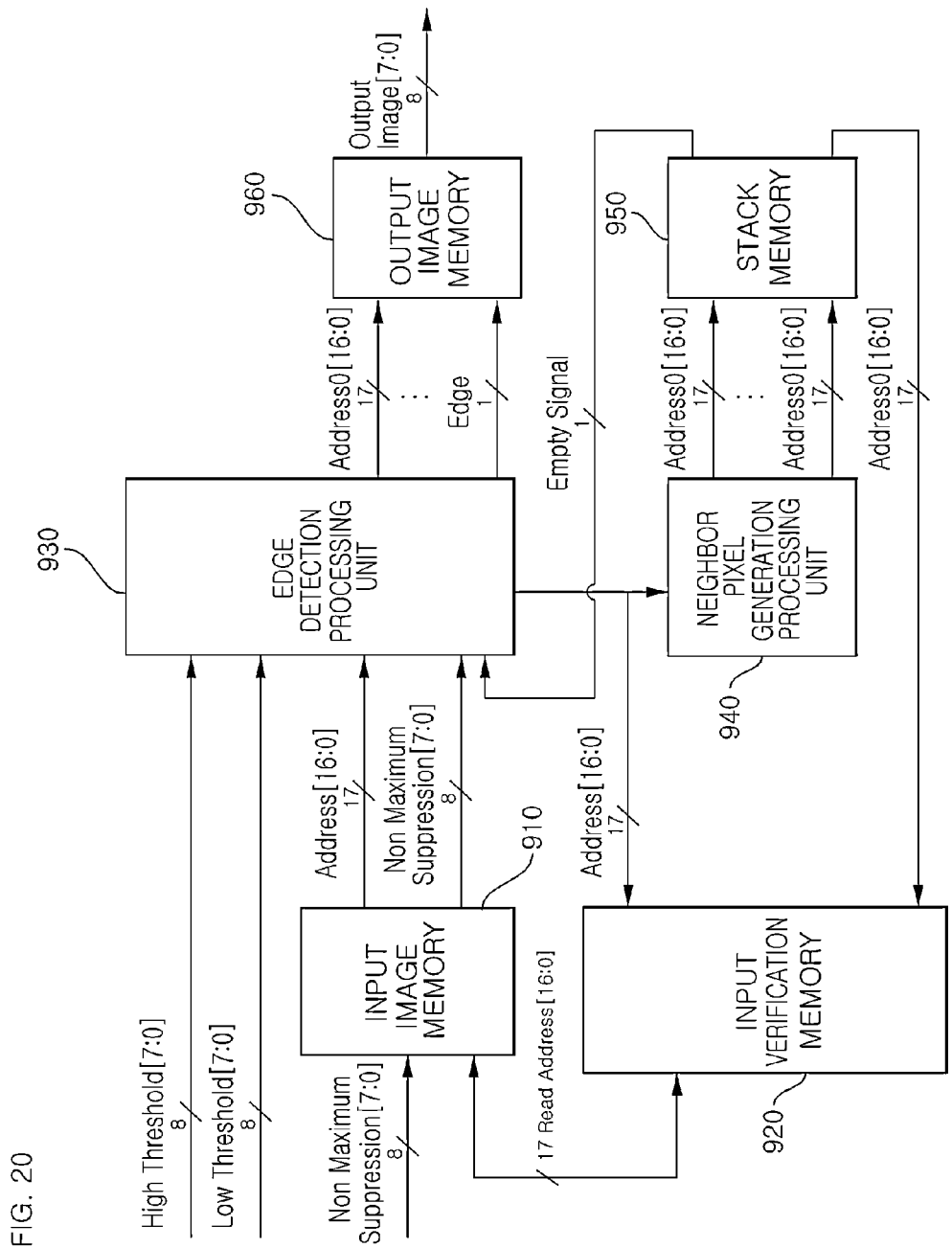
FIG. 20 is a diagram to describe a history edge detector.
Figure 21:
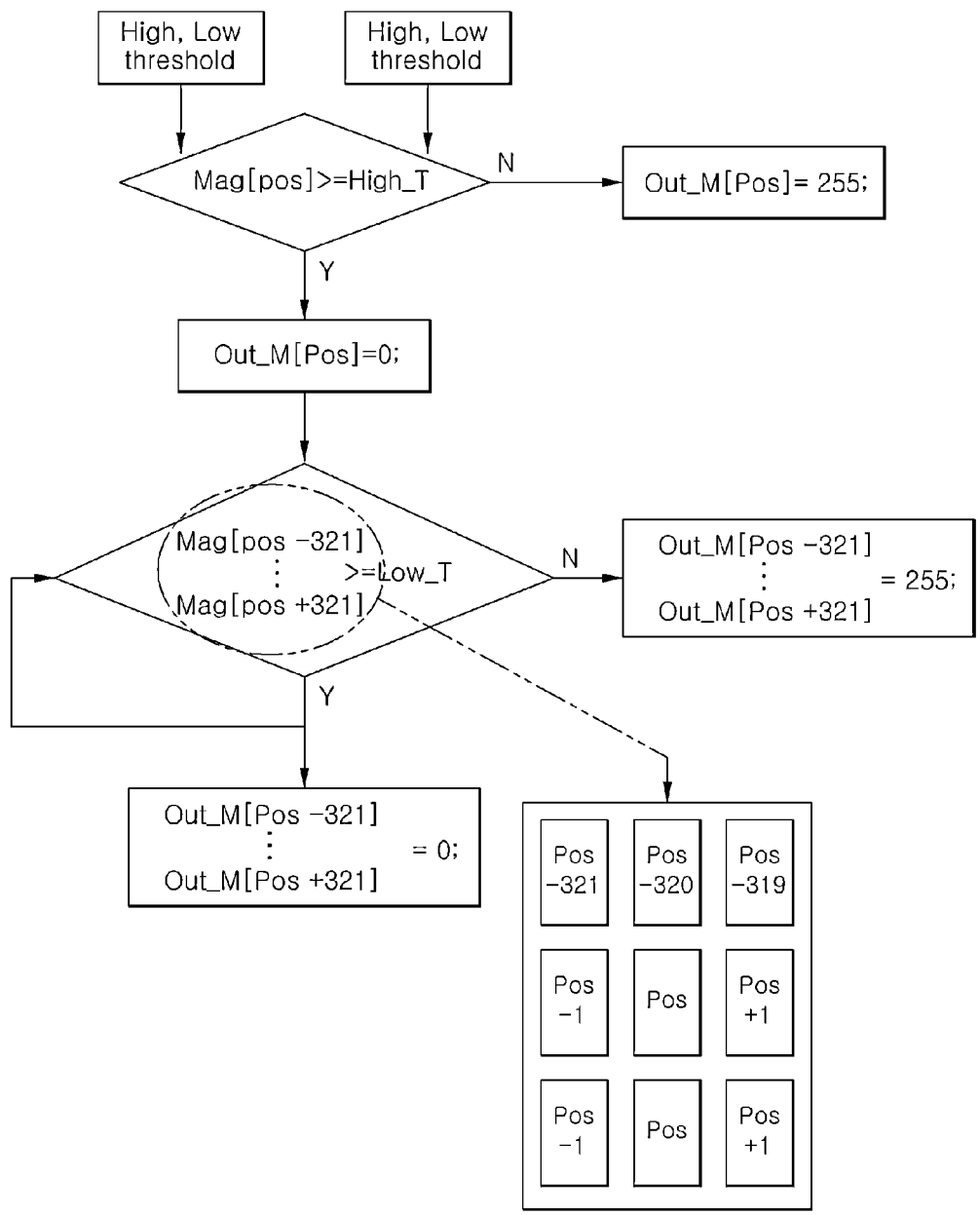
FIG. 21 is a diagram to describe an algorithm of the history edge detector.

FIG. 5 is a block diagram illustrating a high-speed edge detection apparatus using an image processing scheme according to an exemplary embodiment of the present invention. FIGS. 6A through 6G illustrate result images by the edge detection apparatus of FIG. 5. Specifically, FIG. 6A illustrates an example of an input original image, and FIG. 6B illustrates an example of a noise-removed image after the input original image passes through a noise removal unit. FIG. 6C illustrates an example of an X-axially gradient processed image after the noise-removed image passes through a gradient processing unit, and FIG. 6D illustrates an example of an Y-axially gradient processed image after the noise-removed image passes through the gradient processing unit. FIG. 6E illustrates an example of an image indicating magnitude of the gradient after the gradient-calculated image passes through a gradient magnitude calculator, and 6F illustrates an example of an image in which an overlapping edge is removed after the gradient magnitude calculated image passes through a maximum edge detector. FIG. 6G illustrates an example of a final edge detection result after an overlapping noise-removed image passes through a history edge detector. FIG. 7 is a diagram to describe a noise removal unit. FIGS. 8A and 8B are diagrams to describe a method of calculating a weight in the noise removal unit. Specifically, FIG. 8A is a diagram illustrating an example in which the noise removal unit determines a distance-based weight, and FIG. 8B is a diagram illustrating an example in which the noise removal unit determines a brightness-based weight. FIG. 9 is a diagram to describe an image storing and dividing unit of the noise removal unit in detail. FIG. 10 is a diagram to describe a range weight LUT of the noise removal unit in detail. FIGS. 11A and 11B are graphs showing an example of distribution of weights in the noise removal unit. Specifically, FIG. 11A is a graph showing an example of distribution of distance-based weights in the noise removal unit, and FIG. 11B is a graph showing an example of distribution of brightness-based weights in the noise removal unit. FIG. 12 is a diagram to describe a gradient operation processing unit. FIG. 13 is a diagram to describe an image storing and dividing unit in the gradient operation processing unit in detail. FIG. 14 is a diagram to describe a maximum edge detector. FIG. 15 is a diagram to describe conditions according to eight directions and positions of pixels according thereto in the maximum edge detector. FIG. 16 is a diagram to describe conditions according to eight directions and corresponding equations in the maximum edge detector. FIG. 17 is a diagram to describe an image storing and dividing unit in the maximum edge detector in detail. FIG. 18 is a diagram to describe a threshold calculation processing unit. FIG. 19 is a diagram to describe an example of distribution of an image and a threshold calculation process in the threshold calculation processing unit. FIG. 20 is a diagram to describe a history edge detector. FIG. 21 is a diagram to describe an algorithm of the history edge detector. Hereinafter, a description will be made with reference to FIGS. 5 through 21.

FIG. 5 illustrates blocks for showing an edge detection result as an image based on a ratio of edges to an input image in an edge detection method according to an exemplary embodiment of the present invention.

Referring to FIG. 5, the edge detection apparatus includes a noise removal unit 100, a gradient operation processing unit 300, a gradient magnitude calculator 500, a maximum edge detector 700, a threshold calculation processing unit 800, and a history edge detector 900.

The noise removal unit 100 functions to remove noise in an image that is input from a camera. General noise removal technologies blur even an edge while removing noise and thus, may degrade the edge detection performance. However, the noise removal unit 100 used in the present invention uses a bilateral filtering technology. Unlike other noise removal technologies, the bilateral filtering technology may preserve an edge while removing noise and thus, may show the optimal performance in edge detection.

FIGS. 6A through 6G show result images obtained while an input image passes through the respective processing units according to the present invention. FIG. 6A shows an original image that is input from a camera, and FIG. 6B shows an image obtained after the input original image passes through the noise removal unit 100. FIG. 6C shows an image of which X-axial gradient is calculated among images obtained after the noise-removed image passes through the gradient operation processing unit 300. FIG. 6D shows an image of which Y-axial gradient is calculated among images obtained after the noise-removed image passes through the gradient operation processing unit 300. FIG. 6E shows a gradient magnitude calculated image while the gradient-calculated image passes through the gradient magnitude calculator 500. 6F shows an image obtained after the gradient magnitude calculated image passes through the maximum edge detector 700. FIG. 6G shows a final edge detected image after an unnecessary edge removed image passes through the history edge detector 900.

FIG. 7 shows a detailed diagram of the noise-removal unit 100. The noise removal unit 100 includes an image storing and dividing unit 120, a range weight LUT 140, and a noise removal calculator 160. The noise removal unit 100 used in the present invention uses a distance-based weight and a brightness-based weight that is different based on a value of an image.

The image storing and dividing unit 120 functions to store, in a memory, an image that is received from a camera, and to divide the image into 256 pixels (=16×16 pixels).

The range weight LUT 140 functions to read, from Read Only Memory (ROM) a range weight that is pre-calculated and thereby stored using a value of a divided image as an address value.

The noise removal calculator 160 outputs a noise-removed image using an image that is divided by the image storing and dividing unit 120 and a weight that is received from the range weight LUT 140. Here, a brightness weight is pre-calculated and calculated as a constant value by the noise removal calculator 160.

FIG. 8A is a diagram to describe a range weight that is a distance-based weight. Among 16×6(16) pixels received from the image storing and dividing unit 120, a central pixel is a pixel being calculated. Here, a pixel that is positioned further away from the central pixel being calculated has a low weight, and a pixel that is positioned close to the central pixel has a high weight. When window of an image to be divided is determined, each pixel and a position of a pixel to be calculated do not change. Therefore, a pre-calculated value may be used.

FIG. 8B is a diagram to describe a brightness-based weight. Among 16×6 pixels received from the image storing and dividing unit 120, a central pixel is a pixel being calculated. A pixel having a brightness value slightly different from a brightness value of the pixel being calculated has a high weight. As shown in an example of FIG. 8B, when a pixel being calculated has a brightness value of 80, a pixel having a brightness value of 5 has a small weight compared to a pixel having a brightness value of 70. This is because a difference between 80 and 70 is smaller than a difference between 80 and 5. Here, weights are determined based on pixel values and thus, the present invention may pre-store all the difference values in ROM and may read the stored difference values using a LUT scheme and then use the difference values for calculation.

FIG. 9 shows a detailed diagram of the image storing and dividing unit 120. An image is output as 16×16 pixels through 15 line memories 124 and 241 delay apparatuses 122.

FIG. 10 shows a range weight address calculator 142 and 256 range weight ROMs 144 that constitute the range weight LUT 140.

FIG. 11A is a graph and an equation indicating a range weight that is a distance-based weight. FIG. 11B is an equation for calculating a weight that is a brightness-based weight and a graph showing a corresponding value.

FIG. 12 shows an image storing and dividing unit 320 and a gradient calculator 340 that constitute a gradient operation processing unit 300.

The image storing and dividing unit 320 outputs four up, down, left, and right pixels of an image that is being currently calculated.

The gradient calculator 340 calculates an X-axial gradient as an X-axial primary differentiation result using left and right pixels. The gradient calculator 340 calculates a Y-axial gradient as an Y-axial primary differentiation result using up and down pixels.

FIG. 13 is a diagram to describe a detailed operation of the image storing and dividing unit 320. The image storing and dividing unit 320 includes two line memories 324 and five delay apparatuses 322. The image storing and dividing unit 320 divides an input image into four up, down, left, and right pixels and thereby outputs four pixels.

FIG. 14 is a block diagram to describe an operation of an image storing and dividing unit 720 and a maximum edge calculator 740 that constitute the maximum edge detector 700.

The image storing and dividing unit 720 functions to divide, into nine regional images, an input image of which gradient magnitude is calculated.

The maximum edge calculator 740 is a processing unit to substantially calculate a maximum edge. Even though the gradient magnitude calculated image is an image that indicates an edge by itself, thickness of the edge appears to be thick and thus, includes unnecessary edge information. The maximum edge calculator 740 removes such overlapping and unnecessary edge, thereby making only a thin edge remain.

FIG. 15 shows eight conditions according to eight directional pixel values around a pixel to be calculated by the maximum edge calculator 740. Whether a corresponding pixel is an edge is determined based on the conditions.

FIG. 16 shows actual equations according to eight conditions and an operation process in the maximum edge calculator 740.

FIG. 17 is a diagram indicating that the image storing and dividing unit 720 includes two line memories 724 and seven delay apparatuses 722. The image storing and dividing unit 720 functions to divide an input gradient magnitude calculated image into nine regional images and output the same.

FIG. 18 is a diagram to describe a detailed operation of the threshold calculation processing unit 800. The threshold calculation processing unit 800 includes an image distribution analyzer 820, an image distribution memory 840, and a threshold calculator 860.

A maximum edge image input to the threshold calculation processing unit 800 may be referred to as candidates of values that may be a final edge. Input threshold ratio information is a value used to determine a ratio of pixels to be a final edge in the final edge image. Therefore, the image distribution analyzer 820 accumulatively stores the maximum edge image in the image distribution memory 840 and thereby generates a histogram. The image distribution analyzer 820 functions to transmit, to the threshold calculator 860, the maximum number of edge pixels corresponding to an input threshold ratio. The threshold calculator 860 generates two thresholds based on information about the input maximum number of edge pixels.

FIG. 19 is a diagram illustrating an example of calculating a threshold. When high threshold ratio information is input as 0.6, the above numerical number indicates that only 60% of pixels of an edge candidate set present in the maximum edge image will be determined as the final edge. Accordingly, when an address value of a position corresponding to 60% of the generated histogram is 14, and when this value is set as a threshold, only maximum edge pixels corresponding to 60% are consequently selected. Here, when a low threshold ratio is input as 0.2, the above numerical number indicates 20% of a high threshold. That is, the low threshold is affected by the high threshold.

FIG. 20 is a diagram to describe a detailed operation of the history edge detector 900. The history edge detector 900 includes an input image memory 910, an input verification memory 920, an edge detection processing unit 930, a neighbor pixel generation processing unit 940, a stack memory 950, and an output image memory 960. The input image memory 910 receives an image from a maximum edge detection and alternately inputs the image into two input memories. The input verification memory 920 is a memory for verifying whether to perform primary search in order to avoid a duplicate operation in extracting a robust edge and a weak-but-necessary edge using high and low thresholds. The edge detection processing unit 930 performs a process of extracting a robust edge and a weak-but-necessary edge using high and low thresholds that are generated from a threshold generator. The neighbor pixel generation processing unit 940 performs a process of searching for neighbor pixels in order to detect a weak-but-necessary edge from neighbor pixels after detection from the edge detection processing unit 930. The stack memory 950 is a memory for processing information using a last-in first-out (LIFO) scheme. The output image memory 960 is a memory for displaying an edge detected portion as block and an edge undetected portion as white when a single frame is completed.

FIG. 21 is a diagram to describe an execution algorithm of the history edge detector 900. Two thresholds and a maximum edge image are received. When a maximum edge pixel to be calculated is greater than a high threshold, the maximum edge pixel is determined to be a final edge. When a pixel less than the high threshold but greater than a low threshold is present by searching eight directions, the corresponding pixel is also determined to be a final edge. Here, when the corresponding pixel is absent, other eight directional pixels are searched. However, when the corresponding pixel is present, neighboring eight directions of the present pixel are searched. That is, it is to detect an edge that is extended from a pixel greater than the high threshold and is greater than the low threshold. The above detection scheme has a characteristic of a recursive algorithm.

Figure 22:
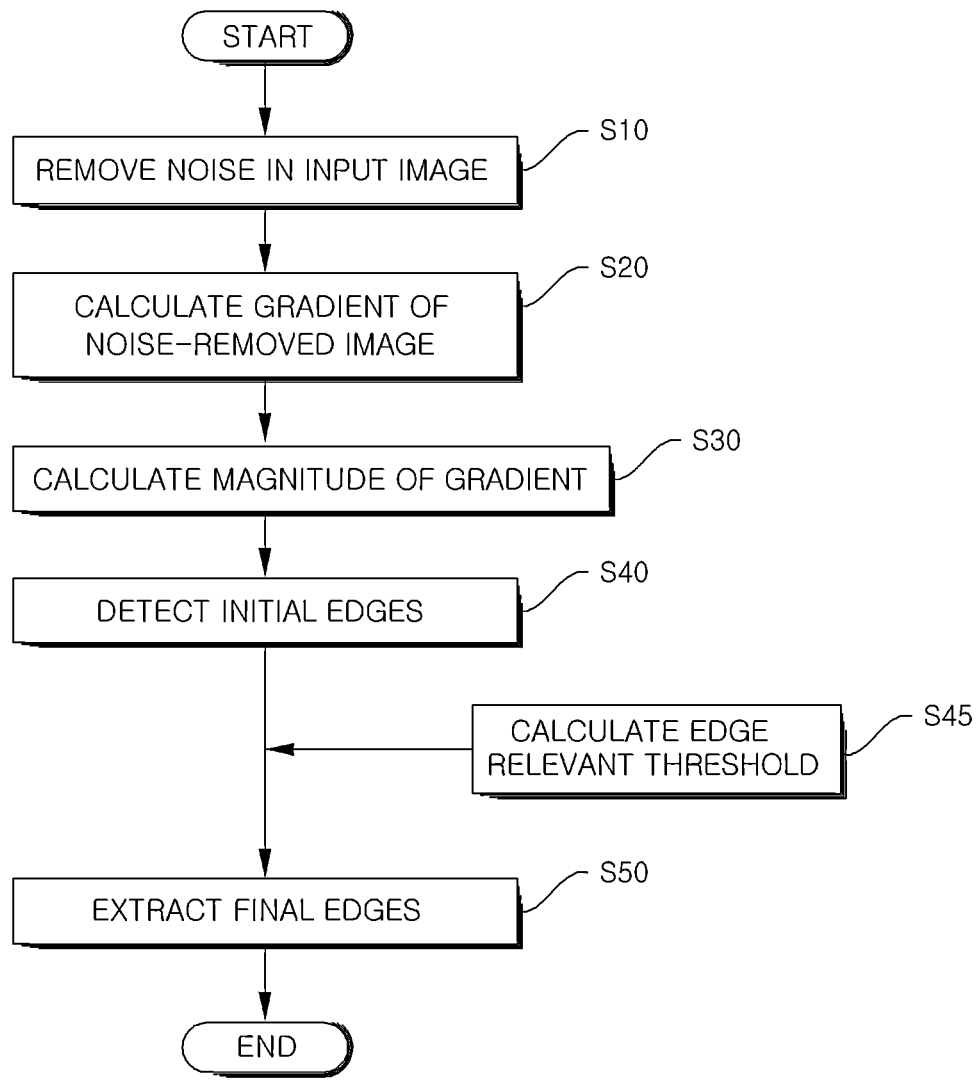
FIG. 22 is a flowchart schematically illustrating an image edge detection method according to an exemplary embodiment of the present invention.

The image edge extraction apparatus 10 described above as an embodiment has a structure suitable for hardware-lization (RTL IP) and is enabled to perform many operations in real time using a hardware characteristic that makes it possible to perform many operations at a time. The image edge extraction apparatus 10 has employed a bilateral filter in order to further improve detection of an edge component and enabled a hysteresis threshold to be automatically processed based on each ratio. Next, an image edge extraction method of the image edge extraction apparatus 10 will be described. FIG. 22 is a flowchart schematically illustrating an image edge extraction method according to an exemplary embodiment of the present invention. A description will be made with reference to FIG. 22.

Initially, the noise removal unit 11 removes noise in an input image (noise removing operation S10). The noise removal unit 11 may remove noise in the input image using a bilateral filter.

Noise removing operation S10 may be performed according to the following order. Initially, the first image divider 21 divides the input image into regional images. Next, the weight-based noise removal unit 22 removes noise in each regional image using a first weight according to a distance difference between regional images or a second weight according to a brightness difference between the regional images.

After noise removing operation S10, the gradient calculator 12 calculates a gradient of the noise-removed image (gradient calculating operation S20).

Gradient calculating operation S20 may be performed according to the following order. Initially, the second image divider 31 divides the noise-removed image into regional images. Next, the regional image selector 32 selects, from among the regional images, a regional image of which the gradient is to be calculated. Next, the regional image gradient calculator 33 calculates a gradient of the selected regional image for each axis by differentiating the selected regional image with respect to each axial direction using neighbor regional images that are adjacent to the selected regional image.

After gradient calculating operation S20, the gradient magnitude calculator 13 calculates magnitude of the gradient (gradient magnitude calculating operation S30).

After gradient magnitude calculating operation S30, the first stage edge detector 14 detects, as first stage edges, edges that satisfy a first condition in the noise-removed image using the gradient and magnitude (first stage edge detecting operation S40).

First stage edge detecting operation S40 may be performed according to the following order. Initially, the third image divider 41 divides, into regional images, an image of which magnitude of the gradient is calculated. Next, the edge determining unit 42 determines whether each regional image corresponds to an edge, based on a relationship between each regional image and neighbor regional images that are adjacent to the each regional image. Next, the determination-based regional image processing unit 43 detects a regional image corresponding to an edge as an edge that satisfies the first condition based on the determination, and removes a regional image not corresponding to the edge based on the determination.

After first stage edge detecting operation S40, the final edge extractor 15 extracts, as final edges, edges that satisfy a second condition among the first stage edges based on an edge related threshold (final edge extracting operation S50). The final edge extractor 15 may use a maximum threshold and a minimum threshold as thresholds.

Final edge detecting operation S50 may be performed according to the following order. Initially, the first threshold-based determining unit 51 determines whether there is a first edge having a value greater than the maximum threshold that is one of thresholds among the first stage edges. Next, the second threshold-based determining unit 52 determines whether there is a second edge having a value greater than the minimum threshold and less than the maximum threshold that is another one of thresholds among first neighbor edges that are adjacent to the first stage edge. Next, the first determination-based edge extractor 53 extracts the first edge and the second edge as the final edges.

After extracting the final edge, the following process may be further performed. That is, the third threshold-based determining unit 54 determines whether there is a third edge having a value greater than the minimum threshold and less than the maximum threshold among second neighbor edges that are adjacent to the edge. Next, the second determination-based edge extractor 55 extracts the third edge as the final edge. The second determination-based edge extractor 55 repeatedly performs the determination until there is no neighbor edge that is adjacent to the edge.

Threshold calculating operation S45 may be performed between first stage edge detecting operation S40 and final edge extracting operation S50. In operation S45, the threshold calculator 18 calculates the threshold based on a ratio of the first stage edges that are distributed in the input image. Threshold calculating operation S45 may calculate the threshold using first stage edges that are obtained from the input image and thus, may be performed before noise removing operation S10.

Threshold calculating operation S45 may be performed according to the following order. Initially, the histogram generator 61 generates a relationship between the input image and the first stage edges as a histogram. The ratio determining unit 62 determines the ratio as the number of first stage edges to be arranged in the input image using the histogram. Next, the maximum value/minimum value calculator 63 calculates the maximum number of first stage edges or the minimum number of first stage edges as the threshold based on the determined ratio.

The aforementioned image edge extraction method may use the final edge as a feature point of an object.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for extracting an edge in an image, comprising:
    a noise removal unit to remove noise in an input image;
    a gradient calculator to calculate a gradient of a noise-removed image;
    a gradient magnitude calculator to calculate magnitude of the gradient;
    a first stage edge detector to detect, as first stage edges, edges that satisfy a first condition in the noise-removed image using the gradient and the magnitude; and
    a final edge extractor to extract, as final edges, edges that satisfy a second condition among the first stage edges based on an edge related threshold.

2. The apparatus of claim 1, wherein the noise removal unit removes the noise in the input image using a bilateral filter.

3. The apparatus of claim 1, wherein the noise removal unit comprises:
    a first image divider to divide the input image into regional images; and
    a weight-based noise removal unit to remove noise in each regional image using a first weight according to a distance difference between the regional images or a second weight according to a brightness difference between the regional images.

4. The apparatus of claim 1, wherein the gradient calculator comprises:
    a second image divider to divide the noise-removed image into regional images;
    a regional image selector to select, from among the regional images, a regional image of which the gradient is to be calculated; and
    a regional image gradient calculator to calculate a gradient of the selected regional image for each axis by differentiating the selected regional image with respect to each axial direction using neighbor regional images that are adjacent to the selected regional image.

5. The apparatus of claim 1, wherein the first stage edge detector comprises:
    a third image divider to divide, into regional images, an image of which magnitude of the gradient is calculated;
    an edge determining unit to determine whether each regional image corresponds to an edge, based on a relationship between the each regional image and neighbor regional images that are adjacent to the each regional image; and
    a determination-based regional image processing unit to detect a regional image corresponding to an edge as an edge that satisfies the first condition based on the determination, and to remove a regional image not corresponding to the edge based on the determination.

6. The apparatus of claim 1, further comprising:
    a threshold calculator to calculate the threshold based on a ratio of the first stage edges that are distributed in the input image.

7. The apparatus of claim 6, wherein the threshold calculator comprises:
    a histogram generator to generate a relationship between the input image and the first stage edges as a histogram;
    a ratio determining unit to determine the ratio as the number of first stage edges to be arranged in the input image using the histogram; and
    a maximum value/minimum value calculator to calculate the maximum number of first stage edges or the minimum number of first stage edges as the threshold based on the determined ratio.

8. The apparatus of claim 1, wherein the final edge extractor uses a maximum threshold and a minimum threshold as the threshold.

9. The apparatus of claim 8, wherein the final edge extractor comprises:
    a first threshold-based determining unit to determine whether there is a first edge having a value greater than the maximum threshold among the first stage edges;
    a second threshold-based determining unit to determine whether there is a second edge having a value greater than the minimum threshold and less than the maximum threshold among first neighbor edges that are adjacent to the first stage edge; and
    a first determination-based edge extractor to extract the first edge and the second edge as the final edges.

10. The apparatus of claim 9, further comprising:
a third threshold-based determining unit to determine whether there is a third edge having a value greater than the minimum threshold and less than the maximum threshold among second neighbor edges that are adjacent to the edge; and
a second determination-based edge extractor to extract the third edge as the final edge,
wherein the third threshold-based determining unit repeatedly performs the determination until there is no neighbor edge that is adjacent to the edge.

11. The apparatus of claim 1, wherein the final edge is used as a feature point of an object.

12. A method of extracting an edge in an image, comprising:
removing noise in an input image;
calculating a gradient of a noise-removed image;
calculating magnitude of the gradient;
detecting, as first stage edges, edges that satisfy a first condition in the noise-removed image using the gradient and the magnitude; and
extracting, as final edges, edges that satisfy a second condition among the first stage edges based on an edge related threshold.

13. The method of claim 12, wherein the removing of the noise comprises:
dividing the input image into regional images; and
removing noise in each regional image using a first weight according to a distance difference between the regional images or a second weight according to a brightness difference between the regional images.

14. The method of claim 12, wherein the calculating of the gradient comprises:
dividing the noise-removed image into regional images;
selecting, from among the regional images, a regional image of which the gradient is to be calculated; and
calculating a gradient of the selected regional image for each axis by differentiating the selected regional image with respect to each axial direction using neighbor regional images that are adjacent to the selected regional image.

15. The method of claim 12, wherein the detecting of the first stage edge comprises:
dividing, into regional images, an image of which magnitude of the gradient is calculated;
determining whether each regional image corresponds to an edge, based on a relationship between the each regional image and neighbor regional images that are adjacent to the each regional image; and
detecting a regional image corresponding to an edge as an edge that satisfies the first condition based on the determination, and removing a regional image not corresponding to the edge based on the determination.

16. The method of claim 12, further comprising:
calculating the threshold based on a ratio of the first stage edges that are distributed in the input image.

17. The method of claim 16, wherein the calculating of the threshold comprises:
generating a relationship between the input image and the first stage edges as a histogram;
determining the ratio as the number of first stage edges to be arranged in the input image using the histogram; and
calculating the maximum number of first stage edges or the minimum number of first stage edges as the threshold based on the determined ratio.

18. The method of claim 12, wherein the extracting of the final edge comprises:
determining whether there is a first edge having a value greater than a maximum threshold that is one of thresholds among the first stage edges;
determining whether there is a second edge having a value greater than a minimum threshold that is another one among the thresholds and less than the maximum threshold among first neighbor edges that are adjacent to the first stage edge; and
extracting the first edge and the second edge as the final edges.

19. The method of claim 18, further comprising:
determining whether there is a third edge having a value greater than the minimum threshold and less than the maximum threshold among second neighbor edges that are adjacent to the edge; and
extracting the third edge as the final edge,
wherein the determining of whether there is a third edge repeatedly performs the determination until there is no neighbor edge that is adjacent to the edge.

* * * * *